United States Patent [19]

Barreto-Mercado

[11] Patent Number: 4,607,312
[45] Date of Patent: Aug. 19, 1986

[54] RADIO CONTROL SECURITY SYSTEM FOR AUTOMOBILE DOORS, TRUNK AND HOOD LOCKS AND ENGINE POWER

[76] Inventor: William Barreto-Mercado, 9 H-6 Vista Bella, Bayamon, P.R. 00620

[21] Appl. No.: 698,230

[22] Filed: Feb. 4, 1985

Related U.S. Application Data

[63] Continuation-in-part of Ser. No. 410,914, Aug. 24, 1982, abandoned.

[51] Int. Cl.[4] ........................................... H01H 47/22
[52] U.S. Cl. ............................... 361/172; 307/10 AT; 307/156
[58] Field of Search ................... 361/172; 307/10 AT, 307/156

[56] References Cited

U.S. PATENT DOCUMENTS

| | | | |
|---|---|---|---|
| 3,100,554 | 8/1963 | Doubek, Jr. .................... | 361/156 X |
| 3,725,939 | 4/1973 | Saltzstein ........................ | 361/172 X |
| 3,953,867 | 4/1976 | Kondo ............................. | 361/156 X |
| 4,236,594 | 12/1980 | Ramsperger .............. | 307/10 AT X |
| 4,383,242 | 5/1983 | Sassover et al. ................ | 361/172 X |
| 4,492,959 | 1/1985 | Mochida et al. ................ | 361/172 X |

FOREIGN PATENT DOCUMENTS

| 2911828 | 10/1980 | Fed. Rep. of Germany ...... | 361/172 |
|---|---|---|---|
| 2051208 | 1/1981 | United Kingdom ................ | 361/172 |

Primary Examiner—Michael L. Gellner
Attorney, Agent, or Firm—Scrivener Clarke Scrivener and Johnson

[57] ABSTRACT

A radio transmitting and receiving system for operating the doors of an automobile to locked or unlocked condition and unlocking the automobile trunk or hood. The unlocking code may also activate the electric power to the engine starter motor, hood and manual switches of the power door operating motor.

7 Claims, 3 Drawing Figures

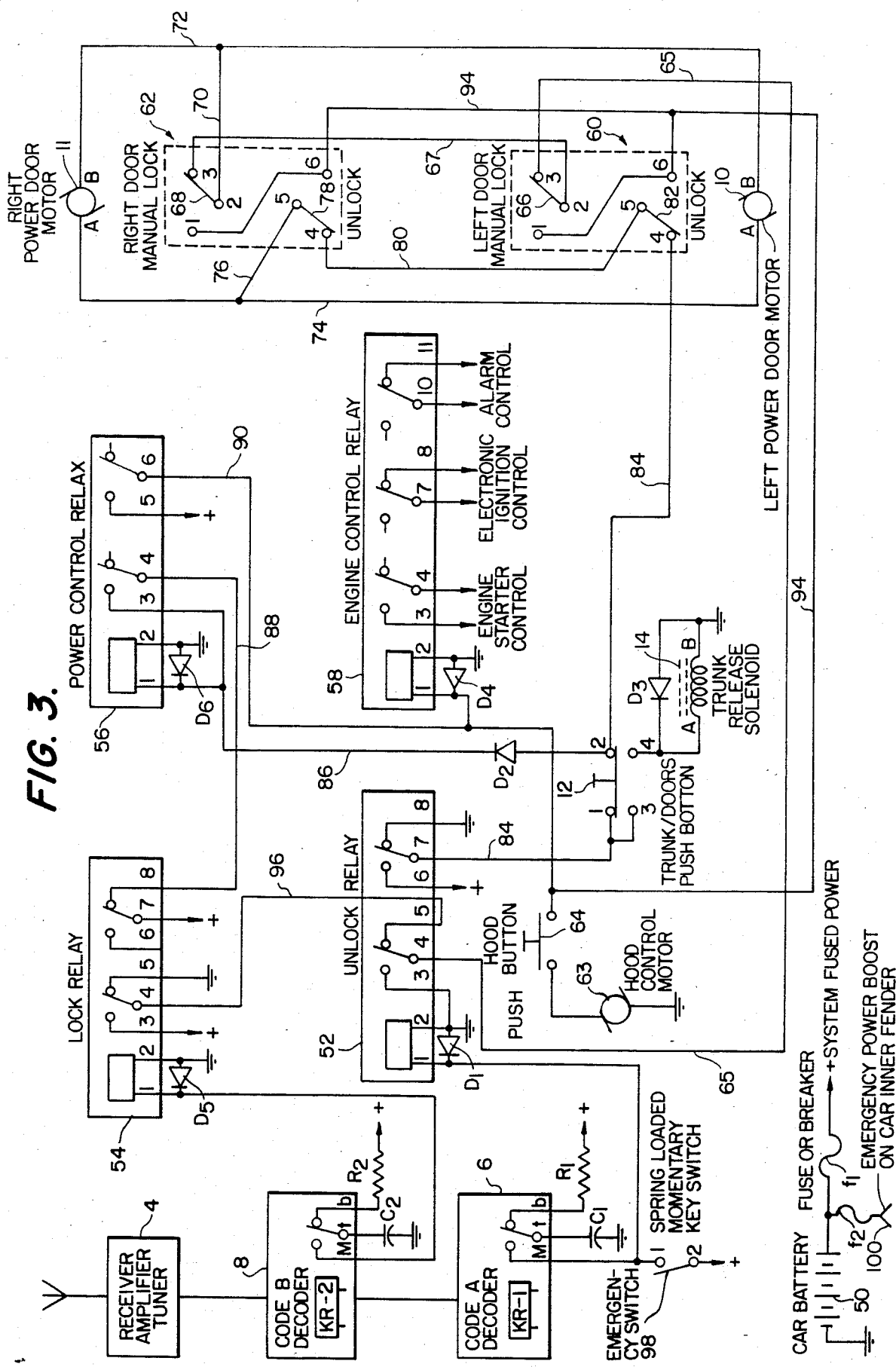

RADIO CONTROL SECURITY SYSTEM FOR AUTOMOBILE DOORS, TRUNK AND HOOD LOCKS AND ENGINE POWER

RELATION TO OTHER CASES

This application is a continuaton-in-part of my co-pending application Ser. No. 410,914, filed Aug. 24, 1982, for Radio Control System For Automobile Door and Trunk Locks, now abandoned.

SUMMARY OF THE INVENTION

The system eliminates the conventional automobile door and trunk locks and provides power operated locks remotely controlled by a VHF radio transmission which is coded with two code signals, one of which energizes the door locks to locking condition and the other of which causes door or trunk unlocking, the trunk unlocking being activated only if a trunk transfer push button switch has been operated. The unlocking code may also activate the electric power to the engine starter motor, hood and manual switches of the power door operating motor.

DESCRIPTION OF THE INVENTION

The system provided by the invention for unlocking or locking the doors of an automobile and for unlocking the trunk and hood of the same automobile as well as the engine electric power, all from outside the automobile permits the removal of the conventional mechanical door locking mechanism, including both the external key-operated apparatus and that controlled by an internal push button, and the removal of the conventional key-operated mechanical trunk lock, and the substitution of an externally operable radio controlled lock and unlock system for the doors and an unlock system for the trunk and hood.

DESCRIPTION OF THE DRAWINGS

FIG. 3 is a circuit diagram of a modification of the invention.

GENERAL OPERATION

Figure 1:
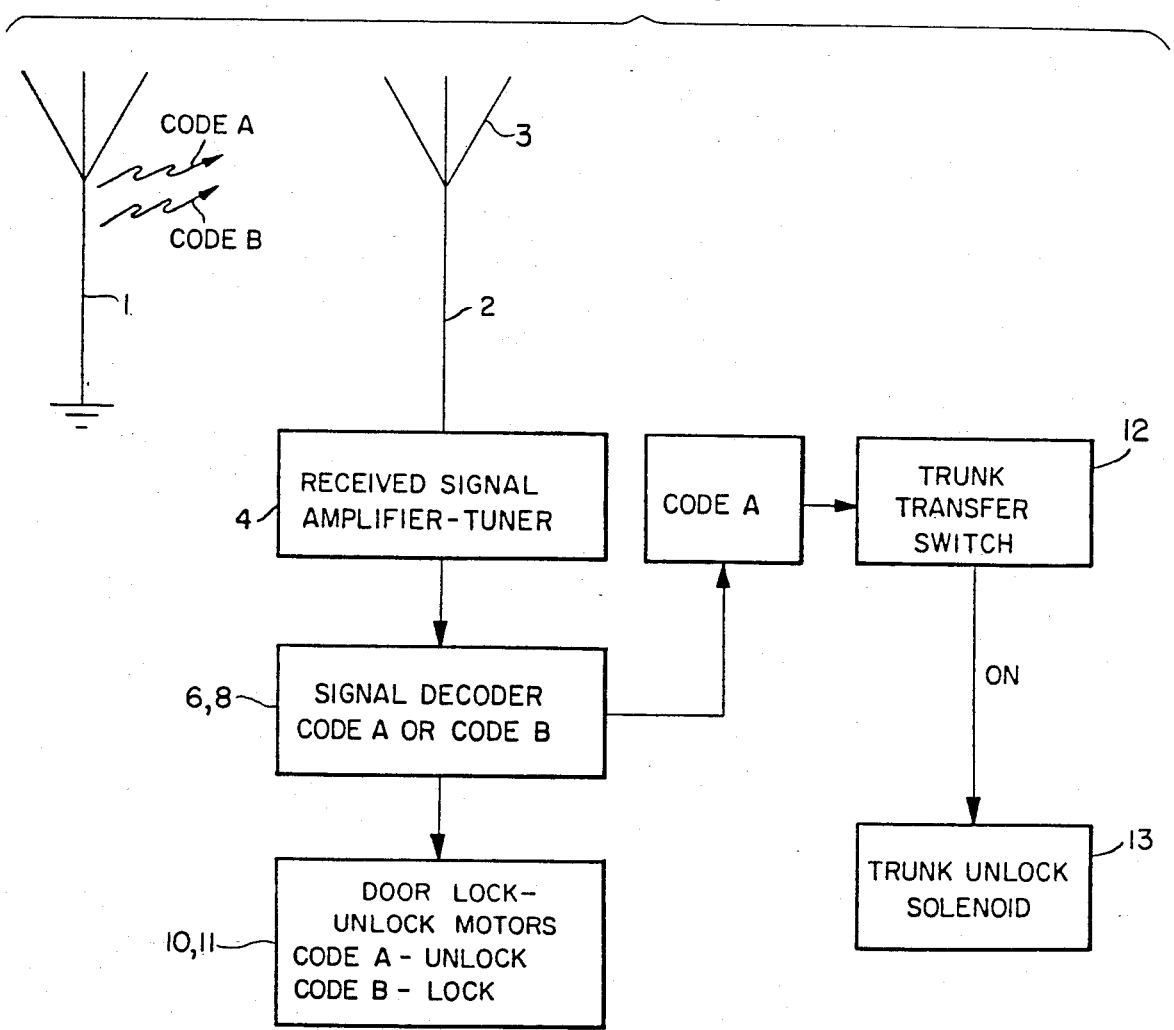
FIG. 1 is a schematic diagram illustrating the parts and operation of the system provided by the invention.

As illustrated schematically in FIG. 1 of the drawings the system comprises transmitting means 1 external to the automobile for transmitting a very high frequency radiation modulated by two different coded signals A and B, and receiver means 2 carried by the automobile for receiving the transmitted radiation. The transmitting means 1 is constructed and adapted for relatively short range (twenty to thirty feet, for example) radiation and therefore may be small enough to be carried by the person having custody of the automobile, and in accordance with known technology it may be very small and lightweight and take any easily carried configuration such as that of a ball point pen. The construction and operation of the transmitting means and the means for modulating the radiation with two different code signals are well known and within the state of the art, and therefore do not form part of the present invention and will not be further described in this specification.

The VHF transmitter/encoder 1 is a modified version of a garage door operating system transmitter encoder which has an RF frequency of 310 megahertz. A major modification which may be made encompasses the addition of another integrated circuit to increase the total number of possible code combinations that can be achieved, but this does not interfere with the parameters of the specifications stipulated by FCC. The addition of the extra integrated circuit increases the number of different codes per approved frequency channel from 256 up to 65,536. The transmitter unit 1 may be made in easily carried forms such as cigarette lighters, ball point pens, key holders, or any other convenient shape. The transmitter unit 1 may carry a code selector switch which enables the transmitter to be changed from one code to another at the operator's discretion. One of the two codes A or B is assigned to the door locking function while the other is assigned to the door unlocking function and the trunk lid releasing function. The electrical connnection to this switch is programmable and may be made unique to a particular car. For the purposes of this description, code A is assigned to the door unlocking function and the trunk releasing function and code B to door locking function.

The circuitry of the amplifier and tuner 4 for the received signal is conventional and need not be further described here because they are already known to those skilled in the arts to which it pertains.

Each signal decoder 6, 8 is also conventional and its circuitry need not be described here as it does not per se form part of my invention. It is operable to distinguish between codes A and B and to pass on the transmitted and received coded signal to the door lock-unlock motors 10, 11. If code A is transmitted and received, and if the trunk transfer push button 12 is operated circuitry is provided to operate the trunk unlock solenoid to open the trunk lid.

The receiving means 2 carried by the automobile, and preferably installed in the trunk, is schematically disclosed in FIG. 1, and in accordance with known technology no external antenna is required, and the receiver may be operated from the car battery with very low power consumption and with no problem of interference with the electrical system of adjacent automobiles. The receiving means comprises, broadly and essentially, an antenna 3 which may be mounted inside the trunk, means 4 for amplifying and tuning the received signal and supplying it to decoding means 6, 8 which identify the modulation of the received signal as either code A or code B. If code B is received the door lock-unlock motors 10, 11 are energized to operate the door locks to locked condition. If code A is received while a doors/trunk transfer switch 12 is at rest (un-operated) then the door lock-unlock motors 10, 11 are energized to operate the door locks to unlocked condition. Alternatively, if the doors/trunk push button 12 is operated and held in the position while code A is received, then a trunk unlock solenoid 13 will unlock the trunk. Stated differently, signal A controls separately either the unlocking of the doors or the unlocking of the trunk but not both at the same time, and which is unlocked depends on the state of the push button 12. The following chart is a summary of the above:

| RECEIVED AND DECODED SIGNAL | TRANSFER PUSH BUTTON | DOOR | TRUNK |
| --- | --- | --- | --- |
| Signal B | Immaterial | Locked | No Action |
| Signal A | Un-operated | Unlocked | No Action |

| RECEIVED AND DECODED SIGNAL | TRANSFER PUSH BUTTON | DOOR | TRUNK |
|---|---|---|---|
| Signal A | Operated | No Action | Unlocked |

Figure 2:
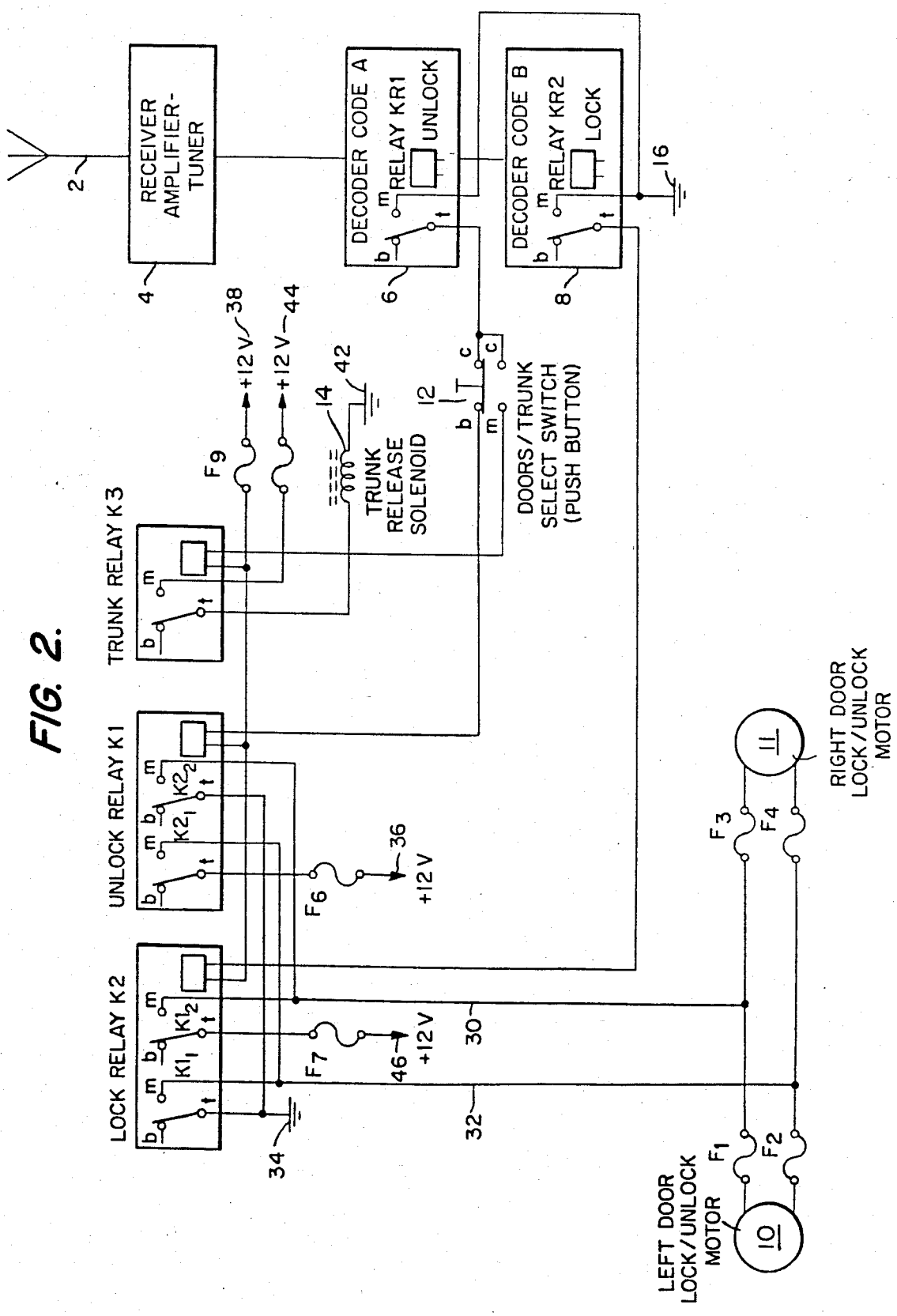
FIG. 2 is circuit diagram of a system embodying the invention.

With reference now to the circuitry of FIG. 2 the door unlock code A identifying means 6 comprises relay kR-1 having contact m which is connected to ground at 16 and contacts b, t which are connected to door unlock relay K-1 which has two sets of contacts each of which includes a contact m. Both contacts m are connected to the door lock-unlock motors 10, 11 by leads 30, 32. The other relay contacts b, t of the two sets of contacts are connected to ground at 34 and to power at 36. Thus, reception of code A at 6 will operate door unlock relay K-1 to close the relay switches to energize the door lock-unlock motors to unlock the automobile doors.

The trunk select push button switch 12 has two sets of contacts, one set b, c being normally connected by the push button to close the circuit between contacts m, t of the unlock relay kR-1 and the door unlock relay K-1, and the normally open contacts, m c which are operable on closing of the trunk select switch to connect trunk relay K-3 in circuit between power at 38 and ground at 16, thereby operating the relay to close switch m, t and connect the trunk relay solenoid 12 in circuit with ground at 42 and power at 44, thereby operating the trunk release solenoid to open the trunk lid.

The lock code identifying means 8 comprises relay kR-2 having contact m which is connected to groun at 16 and contacts b, t which are connected to lock relay K-2, which has two sets of contacts each of which includes a contact m both of which are connected to the door lock-unlock motors 10, 11 by leads 30, 32 and normally open contacts b, t which are connected to ground at 34. Receipt and identification of code B signal closes relay kR-2, energizing lock relay K-2 by connecting it to ground at 16 and power at 38. Energization of the relay K-2 closes both sets of contacts connecting the door lock-unlock motors 10, 11 to power at 46 and ground at 34 thereby energizing the motors to lock the automobile doors.

The lock-unlock motors of the system are standard manufacturer's equipment used to provide power door lock-unlock means. However, a modification has been implemented with the addition of protective fuses which are designated in FIG. 2 by the letter F and a numeral, and which are operative to prevent total system failure in the event of a motor burnout.

With reference now to FIG. 3 a system modified with respect to FIG. 2 is shown including a number of additional and improved features which will become apparent as the description process.

As in FIG. 2 the numerals 4, 6 and 8 in FIG. 3 refer to the receiver-amplifier and the code A and code B decoders, respectively. Relays Kr1 and Kr2 are respectively associated with each decoder 6 and 8 and each relay has a switch for connecting a contact t with either a contact b or a contact m depending upon whether the relay is energized or de-energized. The respective contacts t are connected to a plate of condensers $C_1$ and $C_2$ which are retained charged when the relays are deenergized through contacts t and b the latter being normally connected through suitable resistors $R_1$, $R_2$ to the vehicle 12 volt battery 50 designated, for purposes of simplicity, throughout FIG. 3 by the + symbol.

When the respective relays Kr1 and Kr2 are energized the switches are operated to engage contacts t and m and, for a brief moment measured in milliseconds, connect the charge on each condenser plate with respective unlock and lock relays 52, 54.

From the foregoing it can be seen that the contacts of kR1 and kR2 form time limiting circuits designed to provide a positive pulse to the respective unlock and lock relays 52, 54. These limiting circuits are designed to prevent the relays 52, 54 from being permanently energized in event of a receiver failure; that is, should one receiver output driving transistor develop a continuous "on" condition, this will not cause a permanent activation of the lock or unlock relay connected thereto nor of the motors controlled thereby. This prevents major system damage or blockage.

The respective unlock and lock relays 52, 54 each have eight contacts numbered 1 through 8 in the respective relays and whose function will be later described. In addition to the unlock and lock relays 52, 54, the invention includes a power control relay 56 having six contacts numbered 1 through 6 and an engine control relay 58 having a plurality of sets of contacts depending upon the components to be controlled, 8 contacts being illustrated. In addition the system includes left and right manual door locking units 60, 62, each unit including six contacts numbered 1 through 6, respectively, and associated with the units 60, 62 and the power door motors 10, 11 for each of the respective doors. Finally, the system includes a hood control motor 63, a hood push button 64 and the trunk/door push button 12 which serves the same function as in the circuit of FIG. 2.

Operation of FIG. 3

Door Unlocking By Radio Transmitter

Doors unlocking via the radio transmitting reception demodulation and decoding of code A in decoder 6 causes output relay kR-1 to be energized. The kR-1 t contact puts the charge from condenser $C_1$ thru the m contact to contact 1 of the unlock relay coil 52 thereby energizing the latter. With the unlock relay energized for approximately 350 mili seconds the following series of events take place:

Unlock relay contacts 3 and 4 are connected thus grounding contact 4 which is connected by lead 65 to switch contact 3 of the left door lock unit 60. A manually operable lock switch 66 is connected to contact 2 of unit 60 and is normally positioned to connect contacts 2 and 3. Contact 2 is connected by lead 67 to contact 3 of the right door lock unit 62 which is normally connected by manual switch 68 to contact 2 of unit 62. This latter contact is connected by leads 70, 72 to side B of each power door motor 10, 11, the lead 72 being connected through the motors 10, 11 to the sides thereof marked A and from thence via leads 74, 76 to contact 5 of door lock unit 62 which is normally connected by a manual unlock switch 78 with a contact 4 connected by lead 80 to contact 5 of unit 60 and normally connected by manually operable unlock switch 82 with contact 4 of door lock unit 60. Contact 4 is connected to lead 84 and through trunk/door push button 12 in said lead to contact 7 of unlock relay 52 which is now connected to contact 6 and hence to the vehicle battery due to the momentary energization of the coil of relay 52. With the circuit through both power door motors 10, 11 now complete both are operated to unlock the doors.

The routing described above through both the manual lock and unlock switches of each lock unit 60, 62, prevents clashing of commands when two different people generate different commands, one manually and the other by the transmitter in which event both commands are annulled unless they are the same. Though the circuitry just described has been traced starting with ground, those skilled in the art will understand that source power is delivered first to side A of the motors 10, 11 to operate them in the unlock mode. To operate them in the lock mode power is delivered to side B of the motors as will become apparent.

When contacts 6 and 7 of unlock relay 52 are connected upon energization of the relay, a momentary charge flows through lead 84 and switch 12 to lead 86 connected through blocking diode $D_2$ with contact 1 of the coil of power control relay 56 which is connected by contact 2 thereof to ground. Upon the energization of the coil of relay 56 contact 3 becomes connected to contact 4 which in turn is connected via lead 88 to the vehicle power source through contacts 8 and 7 of now de-energized lock relay 54. Thus a semi-permanent power supply is provided under the control of the lock relay 54 to the coil of relay 56 which operates as a self-latching circuit to retain the coil energized, and in addition to connecting contacts 3 and 4 for their self-latching function, contact 6 of power control relay 56 is connected to contact 5 and to the vehicle power supply to supply via lead 90 power to the coil of engine control relay 58. Lead 90 is also connected through normally open hood push button 64 with hood control motor 63 and by way of lead 94 with the contacts 6 of the respective door lock units 60, 62.

Because the power control relay 56 remains latched in an energized condition following unlocking of the doors in response to a radio transmitted unlock signal, the engine control relay 58 also remains energized so that the circuit to the engine starter is completed and the other circuits, such as the electronic ignition, alarm etc., responsive to energization of the engine control relay are completed or interrupted as required for their intended operation. Because power is also supplied by lead 90 to hood push button 64 it will be apparent that the hood push button can be selectively closed from the interior of the car to operate the hood control motor 63. When power is supplied via leads 90 and 94 to contact 6 and also contact 1 of both door lock units 60, 62, this permits control of the respective door lock motors 10, 11 by manual operation of the switches 66, 82 of unit 60 and switches 68, 78 of unit 62. When the lock switches 66, 68 are manually actuated by suitable push buttons to lock the doors, power is delivered from lead 94 through contacts 6, 1 of the respective manual lock units 60, 62, switches 66, 68 to the respective contacts 2 and from there to the B sides of the motors via leads 70, 72. The lock motors are grounded through the leads 74, 76, switch 78, lead 80, switch 82, lead 84, including trunk push button 12 and contacts 7, 8 of unlock relay 52. When the unlock switches 78, 82 are momentarily operated to unlock the doors they are moved by their push buttons from their position of FIG. 3 into engagement with the contacts 6 to energize the A sides of the motors 10, 11 which are now grounded through the switches 66, 68, lead 65, contacts 4, 5 of unlock relay 52 and a lead 96 connecting contact 5 of the unlock relay 52 with contact 4 of lock relay 54, which in turn is connected by a switch to grounded contact 5 of the lock relay 54. The motors 10, 11 are thus operated to unlock the doors.

Doors Locking By Radio Transmitter

Upon transmission, reception and decoding of code "B", relay kR-2 on the "B" decoder 8 is energized to generate a positive pulse that momentarily operates the lock relay 54. This is done by connecting the charge on the plate of condenser C-2 thru the t and m contacts of the kR-2 relay to the lock relay coil contact 1 which flows thru the coil and to contact 2 and ground. The lock relay remains energized for a maximum time determined by the values of R2, C2 and the coil resistance of the lock relay. With the lock relay energized, battery power flows thru closed contacts 3 and 4, lead 96, thru the normally closed contacts 5 and 4 of the unlock relay 52, through lead 65 to contact 3 of the left door manual lock unit 60, through switch 66 to contact 2, thence to unit 62 through lead 67 and from there to sides B of the motors 10, 11 in a manner previously described. The A sides of the motor are grounded as should be apparent upon inspection through contacts 7, 8 of the unlock relay 62. The foregoing is the current path for operating the power door motors 10, 11 to lock the doors.

The energizing of the lock relay 54 also causes the release of the power control relay 56 and consequently release of the engine control relay 58 to make certain that no intruder can operate the vehicle. Release of power control relay 56 is effected by opening the latching circuit when the switch of lock relay 54 connecting contacts 7, 8 is moved from the position of FIG. 3 into engagement with contact 6 upon energization of the lock relay. The power relay 56 will remain released until operated again upon energization of the unlock relay 52 as previously explained. The mere releasing of the lock relay 54 upon the discharge of condenser C2 does not cause re-activation of the power and engine control relays 56, 58 because the lock relay 54 controls only the latching circuit of the power control relay and not energization of the coil thereof which is controlled only by energization of the unlock relay 52.

From the foregoing it will be seen that following operation of the lock relay 54 in response to a radio transmitted signal to the code B decoder 8 whereby the doors are locked, all further power to the manual switches on the doors is cut-off due to deactivation of the power control relay 56. Thus the doors cannot be unlocked by an intruder who may have access to the door switches as, for example, past a window which has not been fully closed.

Trunk Lid Release

In order to open the trunk lid the trunk/doors push button 12 must be operated and held in that position while the signal for code A is transmitted, received and decoded to operate the unlock relay 52 via the circuitry already described. Now with the unlock relay 52 momentarily energized and the trunk/doors push button operated, battery power from the closed unlock relay contacts 6 and 7 passes thru the trunk/doors push button contacts 3 and 4 to ground thru the trunk release solenoid 14 thereby opening the trunk. It will be noted that when the trunk release solenoid circuit is energized in conjunction with a transmitted code A signal and depression of button 12, the power control relay 56, the power door motors 10, 11 and the door switch units 60, 62 are bypassed whereby unlocking the trunk does not also effect unlocking of the doors nor energization of the engine control relay. Thus maximum safety for the vehicle is obtained in that the vehicle cannot be driven while the operator is occupied with the vehicle trunk.

Emergency Door Unlocking

Mounted on the exterior of the vehicle in a convenient position is a key slot which when a key is inserted into the slot and turned, a normally open switch indicated at 98 is momentarily closed to connect battery power momentarily to the unlock relay 52 to energize and latch the power control relay 56 and the power door motors 10, 11 to unlock the doors in exactly the same manner as when a radio transmitted code A is received by the code A decoder 6. The switch 98 is spring biased to its open position so that the operator need merely turn the key unitl it stops, that is to say, until the switch 98 is closed and he immediately releases the key so that it returns to its original position whereupon the doors are unlocked and the key may be removed.

Emergency Power Boost

There is an insulated positive battery tap 100 extended to the car inner fender connected to a stud (not shown) to provide facility for battery boosting on a locked car with a discharged battery. The driver must connect the positive terminal of a battery of another vehicle to this stud and the negative terminal to his car frame. Note that this also bypasses the fuse f1 in case it is blown and uses higher amperage fuse f2 in its place. The f2 may be replaced even if the car is locked.

I claim:

1. A system for actuating an automobile door locking mechanism to locked or unlocked condition and for actuating an automobile trunk locking mechanism to unlocked condition, comprising:
   (a) an automobile having a lock for each automobile door and a lock for the automobile trunk,
   (b) means for operating each door lock and means including a trunk transfer switch for operating the trunk lock,
   (c) a source of very high frequency radiation located external to the automobile modulated by two different characteristic code signals,
   (d) means carried by the automobile for receiving the transmitted radiation and identifying the code signal with which it is modulated,
   (e) means operable in respone to the reception and identification of one of said code signals to operate the door locking mechanism to locked condition, and
   (f) means operable in response to the reception and identification of the other of said code signals to operate the door locking mechanism to unlocked condition but not the trunk locking mechanism and in closed condition of the trunk transfer switch to operate the trunk locking mechanism to unlocked condition but not the door locking mechanism.

2. The system of claim 1 including a manual door lock unit for each door, a manual lock switch and a manual unlock switch in each unit, said switches being normally arranged to permit operation of said door lock mechanism in response to either of said signals but also arranged that when a signal is received to operate the door locking mechanism to one condition, actuation of a switch to operate the door locking mechanism to the other condition renders the door locking mechanism inoperable while such difference in conditions exist.

3. The system of claim 2 including means for rendering the door locking mechanism inoperable by said manual switches upon operation of the means responsive to said signal to operate the door locking mechanism to locked condition.

4. The system of claim 1 including vehicle power control means responsive to reception of a signal to operate the door locking mechanism to unlocked condition to render the automobile driving means operable and responsive to reception of a signal to operate the door locking mechanism to locked condition to render the automobile driving means inoperable.

5. The system of claim 4 wherein said vehicle power control means includes a power control relay and a latching circuit for retaining said relay energized, said relay and said latching circuit being energized in response to reception of a signal to operate the door locking mechanism to unlocked condition; and said latching circuit being de-energized to effect de-energization of said relay in response to reception of a signal to operate the door locking mechanism to locked condition.

6. The system of claim 4 including a hood unlocking mechanism, means including a normally open switch on the interior of the vehicle connecting the hood unlocking mechanism to said power control means, and means enabling operation of said hood unlocking mechanism by closing said normally open switch only upon response of said power control means to a signal to operate the door locking mechanism to unlocked condition.

7. The system of claim 1 including a key operated switch carried by said automobile accessible from the exterior thereof, said key operated switch being operable upon insertion of a key to operate the door locking mechanism to unlocked condition.

* * * * *